Patented July 7, 1925.

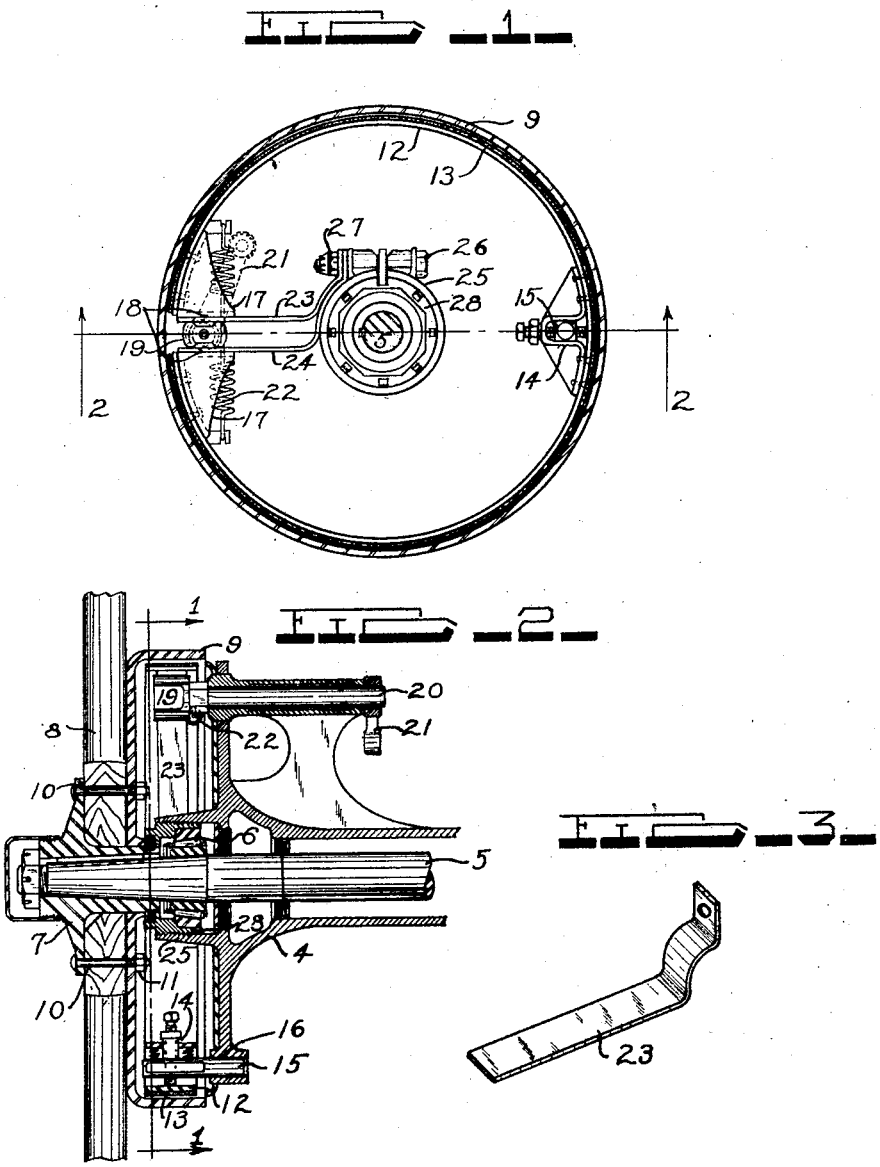

1,544,590

UNITED STATES PATENT OFFICE.

JOHN I. MUNCY, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed April 3, 1924. Serial No. 704,063.

*To all whom it may concern:*

Be it known that I, JOHN I. MUNCY, a citizen of the United States of America, and resident of Detroit, in the county of Wayne and State of Michigan, have invented certain new and useful Improvements in Brakes, of which the following is a specification.

This invention relates to internal expanding band brakes for motor vehicles. Generally stated the object of the present invention is to provide an improved construction and arrangement of parts which will give a more satisfactory and a more dependable operation than heretofore obtained in the use of brakes of this type.

Another object is to provide a means for preventing radial displacement of the band ends when the brake is applied.

A further object is to provide a means whereby a more even pressure will be exerted on the brake drum.

A still further object is to position two spring metal members between the cam and the brake band ends, which members are attached to a portion of the brake support.

These being among the objects of the present invention, the same consists of certain features of construction and combinations of parts to be hereinafter described and then claimed with reference to the accompanying drawing which illustrates a suitable embodiment of the invention having the above and other objects in view.

In the drawings:

Figure 1 is a section taken on the line 1—1 of Figure 2, which is a sectional view taken through the wheel, the braking mechanism, axle and axle housing of a motor vehicle.

Figure 2 is a sectional view taken on the line 2—2 of Figure 1, showing the wheel, brake, and my invention applied thereto.

Figure 3 is a perspective view of one of the resilient members positioned between the cam and brackets, the other being of substantially the same construction.

Referring more in detail to the drawings in which like numerals refer to like parts, 4 indicates a portion of a motor vehicle rear axle housing containing the rear axle shaft 5 journaled in the roller bearing 6 and which projects through and to which is secured the usual rear wheel hub 7 having the wheel 8 and the brake drum 9 attached thereto, by the bolts 10 and the nuts 11.

Within the brake drum 9 is the flexible brake band 12 and the attached lining 13, which are held slightly out of contact with the drum 9 by the spring 22, the bracket 14 and the bolt 15, the latter being held in the bossed opening 16 in the housing 4. The brake band 12 has secured to its ends, two brackets 17 which have normally parallel adjacent faces 18, between which is positioned the cam 19, which, when operated by the shaft 20 and the crank arm 21, tends to force the band ends apart, against the resistance of spring 22.

In the conventional internal band brakes now in use, no members such as 23 and 24 are interposed between the cam 19 and brackets 17, and as the cam 19 is rotated, because of the flexibility of the bands, the cam has a tendency to force one of the band ends radially inwardly away from, and the other, radially outwardly against the brake drum 9, thus causing an uneven pressure of the band 12 throughout its length against the drum 9, resulting in uneven wear of the lining 13 and usually squealing brakes. As a means to prevent the band ends from being radially displaced in this manner and to insure an even drum pressure, I have inserted between the cam 19 and each of the end brackets 17, the members 23 and 24 which may be made of flat spring material and are clamped to the housing hub 25 by the bolt 26 and nut 27, this being the bolt and nut used to draw the hub 25 around the roller bearing cage 28 and lock the latter in place.

It is now evident that when the cam 19 is rotated the friction between the cam 19 and brackets 17, which in the conventional construction because of the flexibility of the band, as previously described tends to force one band end radially inwardly, and the other radially outwardly, will be absorbed by the members 23 and 24, and only the circumferential or direct spreading action will be transmitted to the brackets 17, thus insuring an even and equal expansion of the band 12 with the resulting even application of braking pressure throughout its length.

Formal changes may be made in the specific embodiment of invention described without departing from the spirit or substance of the broad invention, the scope of which is commensurate with the appended claims.

What I claim is:—

1. In a brake mechanism for motor vehicles, the combination with a support, a brake drum, a split flexible band within said drum, bracket secured to said band adjacent the free ends thereof, and a cam positioned between said brackets for forcing the ends of said flexible band apart, of a plurality of flat spring members secured at their one end to said support and having their free ends interposed between said brackets and said cam.

2. In a brake mechanism for motor vehicles, the combination with a brake drum, a support therefor, a split circular flexible band within said drum, and a cam positioned between the ends of said brake band, of a plurality of flat, spring members slidably interposed between said ends of said brake band and said cam, said members being secured to said brake support.

3. In a brake mechanism for motor vehicles, the combination with a brake drum, a support therefor, a split flexible band within said drum, and a cam separating the ends of said brake band, of a plurality of flat, spring members slidably interposed between said ends of said brake band and said cam, said members being detachably secured to said brake support.

4. In a brake mechanism for motor vehicles, the combination with a brake drum, a split flexible band within said drum, and a cam for forcing the ends of said brake band apart, of a plurality of members each comprising a flat portion, a curved portion, and a second flat portion extending at an angle to said first flat portion, said second portion secured to a support and said first portion slidably interposed between the ends of said brake band and said cam to prevent pressure radial to said drum from being transmitted by said cam to said brake ends.

5. In combination with a support, a brake drum, a split circular flexible band within said drum and a cam positioned between the ends of said band, of radially inextensible means secured to said support and slidably projecting between said cam and the ends of said flexible band for preventing pressure radial to said drum from being transmitted from said cam to said band ends.

6. In combination with a support, a brake drum, a split circular flexible band within said drum, and a cam positioned between the ends of said band, of means having a flat portion secured to said support, a curved portion surrounding a portion of said support, and a radially extending flexible portion extending between said cam and the ends of said flexible band for preventing pressure radial to said drum from being transmitted by said cam to said brake ends.

Signed by me at Detroit, Michigan, U. S. A., this 28th day of March, 1924.

JOHN I. MUNCY.

Witnesses:
DONALD B. WAITE,
HODGSON S. PIERCE.